(12) United States Patent
Azzat et al.

(10) Patent No.: US 12,246,825 B2
(45) Date of Patent: Mar. 11, 2025

(54) BLADE PROVIDED WITH A ROOT COMPRISING AN INTEGRATED PITCH ATTACHMENT AND TWO INTEGRATED DAMPER ATTACHMENTS, AND A ROTOR PROVIDED WITH SUCH A BLADE

(71) Applicant: AIRBUS HELICOPTERS, Marignane (FR)

(72) Inventors: Adil Azzat, Aulnay-sous-Bois (FR); Julien Thivend, Bagneux (FR); Sixtine Coston, Bagneux (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/380,235

(22) Filed: Oct. 16, 2023

(65) Prior Publication Data

US 2024/0140599 A1 May 2, 2024

(30) Foreign Application Priority Data

Oct. 26, 2022 (FR) ...................................... 2211154

(51) Int. Cl.
*B64C 27/48* (2006.01)
*F01D 5/30* (2006.01)
(Continued)

(52) U.S. Cl.
CPC ............... *B64C 27/48* (2013.01); *F01D 5/30* (2013.01); *F01D 25/06* (2013.01); *B64C 27/32* (2013.01);
(Continued)

(58) Field of Classification Search
CPC ....... B64C 27/48; B64C 27/51; B64C 27/605; B64C 27/59; F01D 5/30
See application file for complete search history.

(56) References Cited

U.S. PATENT DOCUMENTS 4,504,193 A 3/1985 Mouille
4,556,365 A 12/1985 Mouille et al.
(Continued)

FOREIGN PATENT DOCUMENTS

EP 2540620 B1 2/2015
EP 3246250 B1 11/2018
(Continued)

OTHER PUBLICATIONS

French Search Report for French Application No. FR2211154, Completed by the French Patent Office, Dated May 17, 2023, 9 pages.

*Primary Examiner* — Woody A Lee, Jr.
*Assistant Examiner* — Behnoush Haghighian
(74) *Attorney, Agent, or Firm* — BROOKS KUSHMAN P.C.

(57) ABSTRACT

A blade comprising a blade root extended by an aerodynamic intermediate part that extends up to a free end. The blade root comprises a one-piece attachment body made from composite materials, that is hollow and has a casing that defines an empty internal space, the attachment body incorporating: a pitch attachment configured to be traversed by a pitch link rod connected to a pitch lever, the attachment body incorporating a leading edge attachment configured to be traversed by a leading edge link rod connected to a first drag damper, a trailing edge attachment configured to be traversed by a trailing edge link rod configured to be connected to a second drag damper, and a connection attachment configured to be traversed by at least one connecting rod connected to a first reinforcement of a stratified spherical stop.

20 Claims, 2 Drawing Sheets

(51) Int. Cl.
*F01D 25/06* (2006.01)
*B64C 27/32* (2006.01)
*B64C 27/51* (2006.01)

(52) U.S. Cl.
CPC .......... *B64C 27/51* (2013.01); *F05D 2220/90* (2013.01); *F05D 2240/30* (2013.01); *F05D 2260/96* (2013.01)

(56) References Cited

U.S. PATENT DOCUMENTS

| | | | |
|---|---|---|---|
| 4,732,540 A | 3/1988 | Mouille et al. | |
| 4,915,585 A * | 4/1990 | Guimbal | B64C 27/51 |
| | | | 416/107 |
| 5,141,398 A * | 8/1992 | Bietenhader | B64C 27/51 |
| | | | 416/107 |
| 5,242,266 A | 9/1993 | Mouille | |
| 6,036,442 A * | 3/2000 | Certain | B64C 27/50 |
| | | | 416/143 |
| 7,811,061 B2 * | 10/2010 | Bianchi | B64C 27/48 |
| | | | 416/134 A |
| 9,045,986 B2 * | 6/2015 | Bianchi | B64C 11/26 |
| 9,441,492 B2 * | 9/2016 | Nannoni | B64C 27/48 |
| 10,301,014 B2 * | 5/2019 | Amari | B64C 27/48 |
| 10,479,492 B2 * | 11/2019 | Honnorat | B64C 27/635 |
| 10,597,150 B2 * | 3/2020 | Haldeman | B64C 27/39 |
| 10,689,104 B2 * | 6/2020 | Shimek | B64C 27/39 |
| 2007/0280828 A1 * | 12/2007 | Bianchi | B64C 27/48 |
| | | | 416/134 A |
| 2013/0177422 A1 * | 7/2013 | Bianchi | F01D 5/147 |
| | | | 416/146 R |
| 2014/0212293 A1 * | 7/2014 | Nannoni | F01D 5/30 |
| | | | 416/193 A |
| 2017/0334555 A1 * | 11/2017 | Amari | B64C 27/48 |
| 2018/0002006 A1 * | 1/2018 | Honnorat | B64C 27/605 |
| 2018/0327089 A1 * | 11/2018 | Shimek | B32B 27/38 |

FOREIGN PATENT DOCUMENTS

| | | |
|---|---|---|
| FR | 2427251 A1 | 12/1979 |
| FR | 2516891 A1 | 5/1983 |
| FR | 2529860 A1 | 1/1984 |
| FR | 2584996 A1 | 1/1987 |
| FR | 2653405 A1 | 4/1991 |
| FR | 2671050 A1 | 7/1992 |
| FR | 2898581 A1 | 9/2007 |
| FR | 3053312 A1 | 1/2018 |

* cited by examiner

BLADE PROVIDED WITH A ROOT COMPRISING AN INTEGRATED PITCH ATTACHMENT AND TWO INTEGRATED DAMPER ATTACHMENTS, AND A ROTOR PROVIDED WITH SUCH A BLADE

CROSS-REFERENCE TO RELATED APPLICATIONS

This application claims priority to French patent application No. FR 22 11154 filed on Oct. 26, 2022, the disclosure of which is incorporated in its entirety by reference herein.

TECHNICAL FIELD

The present disclosure relates to a blade provided with a root comprising an integrated pitch attachment and two integrated damper attachments, and a rotor provided with such a blade. For example, the rotor may be a main rotor of a helicopter.

BACKGROUND

A rotorcraft is provided with at least one rotor, and in particular at least one rotor that helps provide lift for the rotorcraft and may also assist propulsion.

A rotorcraft may comprise a rotor that helps control the yawing motion of this rotorcraft. Such a rotor is sometimes arranged at the rear of a rotorcraft, for example on or in a vertical stabilizer, and is then referred to as the "rear rotor".

A rotor is conventionally provided with a head on which at least one blade is arranged.

A blade may be able to rotate in relation to the head about a pitch axis. The rotor may therefore comprise a pitch rod for adjusting the pitch of the blade.

Moreover, a blade may be able to rotate in relation to the head about a drag axis. The rotor may therefore comprise a component conventionally referred to as a "drag damper", a "frequency adapter" or indeed an "elastic drag return member with incorporated damping". This drag damper may provide stiffness in order to allow the blade to return to a mean position in the absence of alternating forces around the drag axis. This drag damper may help dampen the movement of the blade around the drag axis that is a source of vibrations.

A blade may also be able to rotate in relation to the head about a flapping axis.

A blade may be connected to a rotor head in a number of ways.

In particular, a blade may be hinged to a rotor head by a component referred to as a "stratified spherical stop" and a connector interposed between the blade and the spherical stop.

Document FR 2 427 251 A describes a rotor head comprising one opening for each blade. Each opening accommodates a stratified spherical stop permitting the blade to rotate about a flapping axis, a pitch axis and a drag axis that all coincide. The stratified spherical stop comprises a first reinforcement, a stratified central part and a second reinforcement fastened to the rotor head. The blade root is then fastened to a connector, this connector comprising two arms arranged vertically to either side of the first reinforcement of the stratified stop. Two bolts then pass through the arms of the connector, the first reinforcement and a pitch lever. Furthermore, an elastic drag return strut is coupled to a fitting attached to the blade and to the rotor head.

Such an architecture is advantageous. This architecture may facilitate the arrangement of at least one drag damper and the pitch rod, by moving the blade away from the rotor head. However, this arrangement requires the use of an intermediate connector whose shape has poor aerodynamic qualities. Moreover, this connector may be relatively bulky and cumbersome and moves the blade away from the flapping, drag and pitch axes. Furthermore, the pitch rod is then hinged to the connector. Finally, this architecture requires multiple components and may therefore complicate the process of producing a rotor.

Document FR 2 671 050 A1 also describes a rotor provided with a rotor head and, for each blade, a stratified spherical stop connected to a blade root by a connector, this connector being hinged to a pitch lever and to an elastic drag return member.

Document FR 2 584 996 A1 describes a rotor head of this type connecting the blade to the stratified spherical stop by means of a sleeve in order to make the blades foldable, the sleeve carrying the pitch lever.

Document FR 2 584 996 A1 describes another rotor head comprising one opening for each blade. Each opening accommodates a stratified spherical stop. The stratified spherical stop comprises a first reinforcement, a stratified central part and a second reinforcement fastened to the rotor head. The root of each blade is shaped as a forked attachment part with two arms fastened by a bolt to the first reinforcement of the stratified stop. A drag damper is hinged to the rotor head and to an attachment clevis projecting from the blade root, on the trailing edge side of the blade. This clevis is carried by a spacer engaged between the arms of the forked attachment part, the spacer being attached by two nut-and-bolt assemblies. On the leading edge side of the blade, a pitch control lever extends the spacer and ends with a clevis Wherein a pitch control rod is hinged.

Such an architecture is advantageous. However, this arrangement requires multiple components, and in particular a spacer, that may complicate the process of producing a rotor. Moreover, the fork shape is not optimized from an aerodynamic point of view.

Document FR 2 529 860 A1 describes a rotor head comprising two plates. For each blade, a stratified spherical stop comprises a first reinforcement and a second reinforcement attached to the plates by a metal pin. This document also refers to French patent application FR 2 516 891 filed on Nov. 25, 1981 that indicates that the blade comprises rovings forming a rigid loop that is housed in a groove of the first reinforcement of the stratified spherical stop. For each blade, the rotor comprises a pitch control lever attached to the blade by bolts, and hinged both to a pitch control rod and to an elastic drag return member with incorporated damping.

Patent FR 2 898 581 B1 and document US 2007/280828 A1 describe a blade with lower and upper tapes attached to a support fastened to a reinforcement of a stratified spherical stop, this reinforcement being hinged to a pitch rod.

Document FR 2 653 405 A1 describes a blade having a root connected to a hub via a sleeve.

Document FR 3 053 312 A1 describes a blade attached to a fitting comprising two plates.

Document EP 2 540 620 B1 describes a blade attached to a fitting, the fitting being connected to a sleeve.

The prior art documents cited above therefore propose rotors provided with multiple parts that are likely to complicate the manufacture of the rotor and/or generate aerodynamic drag, such as blade connectors, fittings for connecting to a blade horn and/or to an elastic drag return member, connectors or the like.

Documents US 2014/212293 A1 and EP 3 246 250 B1 are also known.

SUMMARY

An object of the present disclosure is thus to propose an innovative blade designed in particular to optimize the production process and/or optimize the mass of the rotor or indeed its aerodynamic drag.

Therefore, the disclosure relates to a blade comprising a blade root extended by an aerodynamic intermediate part that extends up to a free end. The blade root is configured to be connected to a rotor head. The blade is configured to be able to rotate in relation to the rotor head during use, at least about a pitch axis.

In addition, the blade root comprises a one-piece attachment body made from composite materials, the attachment body being hollow and having a casing that defines an empty internal space, said casing being able to surround the pitch axis about which the blade is able to rotate, the attachment body incorporating a pitch attachment configured to be traversed by a pitch link rod connected to a pitch lever, the attachment body incorporating a leading edge attachment configured to be traversed by a leading edge link rod connected to a first drag damper, the attachment body incorporating a trailing edge attachment configured to be traversed by a trailing edge link rod configured to be connected to a second drag damper, the attachment body incorporating a connection attachment configured to be traversed by at least two connecting rods connected to a first reinforcement of a stratified spherical stop.

The expression "leading edge attachment" means that this attachment is situated on the side of the blade comprising the leading edge of the blade. Conversely, the expression "trailing edge attachment" means that this attachment is situated on the side of the blade comprising the trailing edge of the blade.

The term "attachment" denotes one or more parts of the body and, for example, a hole through which a rod and/or wing of a clevis can pass.

The term "one-piece" means that the attachment body is made in a single piece, the elements of the attachment body being inseparable from each other without breakage. A one-piece attachment body therefore cannot be likened to a device comprising several components fastened together by reversible means such as screws, for example.

The blade therefore comprises a one-piece blade root made from composite materials.

Moreover, the intermediate part of the blade and the root are one and the same piece. The attachment body is connected to the intermediate part in such a way as to ensure an aerodynamic transition.

The blade root made from composite materials is provided with a leading edge attachment and a trailing edge attachment for connection to conventional drag dampers, a pitch attachment for connection to a pitch rod, and a connection attachment to be hinged to a rotor head via a stratified spherical stop.

Such a blade root made from composite materials incorporating connections to the pitch rod, the drag dampers and the rotor head may then be dimensioned through the "composite clevis" of the blade, or indeed referred to as the "composite lug".

Implementing a novel type of blade incorporating connections to the pitch rod, the drag dampers and the rotor head helps limit the number of parts of the rotor. This can result in a reduction in weight and indeed in the effort required of operators when maintaining and/or assembling the rotor. In particular, the manufacture of the blade incorporating this blade root provided with the attachment body can be automated, that can tend to reduce manufacturing costs.

Furthermore, the blade may tend to improve the service life of the rotor. In particular, the attachment body may be highly resistant to fatigue.

Moreover, the attachment body forms a hollow shell that may tend to generate less aerodynamic drag than a conventional connector or a forked component.

According to another aspect, connecting the blade directly to a stratified spherical stop, i.e., without using an intermediate connector, may tend to limit the space requirement of the rotor.

According to another aspect, commands to modify the pitch of the blade are transmitted directly to this blade, without passing through a sleeve, for example.

The blade may also comprise one or more of the following features.

According to one possibility, the pitch attachment may be closer to the leading edge attachment than to the trailing edge attachment.

The smallest distance between the leading edge of a section and the pitch attachment is then less than the smallest distance between the trailing edge of this section and the pitch attachment.

In other words, the pitch attachment is arranged on the leading edge side of the blade.

According to one possibility compatible with the preceding possibilities, the pitch attachment may comprise a pitch clevis provided with two parallel pitch wings that are inseparable from said casing, said two pitch wings respectively comprising two pitch holes that are aligned along a pitch connection axis and configured to be traversed by the pitch link rod along said pitch connection axis, said pitch clevis protruding from the casing into an area outside the blade.

The pitch attachment thus comprises a pitch clevis secured to the casing. Moreover, the pitch attachment is then arranged outside the internal space of the body so that it can easily be connected to a pitch rod.

According to one possibility compatible with the preceding possibilities, the leading edge attachment may comprise a leading edge clevis provided with two leading edge wings that are inseparable from said casing, said two leading edge wings respectively comprising two leading edge holes that are aligned along a leading edge axis and configured to be traversed by the leading edge link rod along said leading edge axis, said leading edge clevis protruding from the casing into an area outside the blade.

The leading edge attachment thus comprises a leading edge clevis secured to the casing. Moreover, the leading edge attachment is then arranged outside the internal space of the body. This arrangement may facilitate the connection of an inter-blade drag damper, i.e., a drag damper that extends between two adjacent blades.

If necessary, each pitch wing of the pitch attachment described above may be connected to the two leading edge wings.

The pitch attachment and the leading edge attachment may together form a compact fitting made from composite materials.

Alternatively, the leading edge attachment may comprise two leading edge holes provided in the casing to either side of said internal space according to a leading edge axis, the two leading edge holes being configured to be traversed by the leading edge link rod along said leading edge axis.

In this case, a drag damper extends part way into the internal space, being traversed by the leading edge link rod. This arrangement may tend to reduce the aerodynamic drag of the rotor.

According to one possibility compatible with the preceding possibilities, the trailing edge attachment may comprise a trailing edge clevis provided with two parallel trailing edge wings that are inseparable from said casing, said two trailing edge wings respectively comprising two trailing edge holes that are aligned along a trailing edge axis and configured to be traversed by the trailing edge link rod along said trailing edge axis, said trailing edge clevis protruding from the casing into an area outside the blade.

The trailing edge attachment then comprises a trailing edge clevis secured to the casing. Moreover, the trailing edge attachment is then arranged outside the internal space of the body. This arrangement may facilitate the connection of an inter-blade drag damper, i.e., a drag damper that extends between two blades.

Alternatively, the trailing edge attachment may comprise two trailing edge holes provided in the casing to either side of said internal space according to a trailing edge axis, the two trailing edge holes being configured to be traversed by the trailing edge link rod along said trailing edge axis.

In this case, a drag damper extends part way into the internal space, being traversed by the training edge link rod. This arrangement may tend to optimize the aerodynamic drag of the rotor.

In this context, according to a first embodiment, the attachment body may comprise:
- a pitch attachment provided with two parallel pitch wings that are inseparable from said casing, said two pitch wings respectively comprising two pitch holes that are aligned along a pitch connection axis and configured to be traversed by the pitch link rod along said pitch connection axis, said pitch clevis protruding from the casing into an area outside the blade;
- a leading edge attachment comprising a leading edge clevis provided with two parallel leading edge wings that are inseparable from said casing, said two leading edge wings respectively comprising two leading edge holes that are aligned along a leading edge axis and configured to be traversed by the leading edge link rod along said leading edge axis, said leading edge clevis protruding from the casing into an area outside the blade; and
- a trailing edge attachment comprising a trailing edge clevis provided with two parallel trailing edge wings that are inseparable from said casing, said two trailing edge wings respectively comprising two trailing edge holes that are aligned along a trailing edge axis and configured to be traversed by the trailing edge link rod along said trailing edge axis, said trailing edge clevis protruding from the casing into an area outside the blade.

This first embodiment may be used, for example, to obtain a compact blade root.

According to a second embodiment, the attachment body may comprise:
- a pitch attachment provided with two parallel pitch wings that are inseparable from said casing, said two pitch wings respectively comprising two pitch holes that are aligned along a pitch connection axis and configured to be traversed by the pitch link rod along said pitch connection axis, said pitch clevis protruding from the casing into an area outside the blade;
- a leading edge attachment comprising two leading edge holes provided in the casing to either side of said internal space according to a leading edge axis, the two leading edge holes being configured to be traversed by the leading edge link rod along said leading edge axis; and
- a trailing edge attachment comprising two trailing edge holes provided in the casing to either side of said internal space according to a trailing edge axis, the two trailing edge holes being configured to be traversed by the trailing edge link rod along said trailing edge axis.

This second embodiment may be used, for example, to obtain a blade root that is optimized from an aerodynamic point of view.

According to one possibility compatible with the preceding possibilities, the connection attachment may comprise, for each connecting rod, a set of two connection holes provided in the casing, for example to either side of said internal space, according to a connection axis configured to coincide with a connecting rod.

If necessary, the trailing edge axis, the leading edge axis and the connection axis may be parallel with each other. The pitch connection axis may then lie in a plane perpendicular to these trailing edge, leading edge and connection axes.

According to one possibility compatible with the preceding possibilities, the casing may comprise a layer made from composite materials surrounding said internal space and extending the intermediate part, said casing comprising a laminate reinforcement at least at the trailing edge attachment and the leading edge attachment.

The laminate reinforcement may reinforce the casing, in particular at the parts forming the trailing edge attachment and the leading edge attachment.

In addition to a blade, the disclosure relates to a rotor provided with a rotor head, the rotor comprising at least one stratified spherical stop, the stratified spherical stop comprising a stratified central part inserted between a first reinforcement and a second reinforcement, the second reinforcement being fastened to the rotor head.

This rotor then comprises at least one blade according to the disclosure, said rotor comprising at least two said connecting rods passing through the connection attachment and the second reinforcement, the rotor comprising a pitch link rod passing through the pitch attachment and a pitch hinge of a pitch rod, the rotor comprising a leading edge link rod passing through the leading edge attachment and a leading edge hinge of a first drag damper, the rotor comprising a trailing edge link rod passing through the trailing edge attachment and a trailing edge hinge of a second drag damper.

According to one possibility, the rotor being able to comprise at least three blades according to the disclosure, the trailing edge attachment of a particular blade may be connected by a drag damper to the leading edge attachment of the following blade in a direction of rotation of the rotor and the leading edge attachment of the particular blade is connected by another drag damper to the trailing edge attachment of the preceding blade in said direction of rotation.

Each damper may act as a first drag damper for one blade and as a second drag damper for an adjacent blade.

Moreover, an aircraft may comprise a rotor according to the disclosure.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Three directions X, Y and Z orthogonal to each other are assigned to the blades shown in FIGS. 1 to 4.

The direction X is referred to as the longitudinal direction and extends spanwise along the blade. Another direction Y is referred to as the transverse direction and extends in a direction parallel to the sections of the blade. The third direction Z is referred to as the vertical direction and extends through the thickness of the blade.

Figure 1:
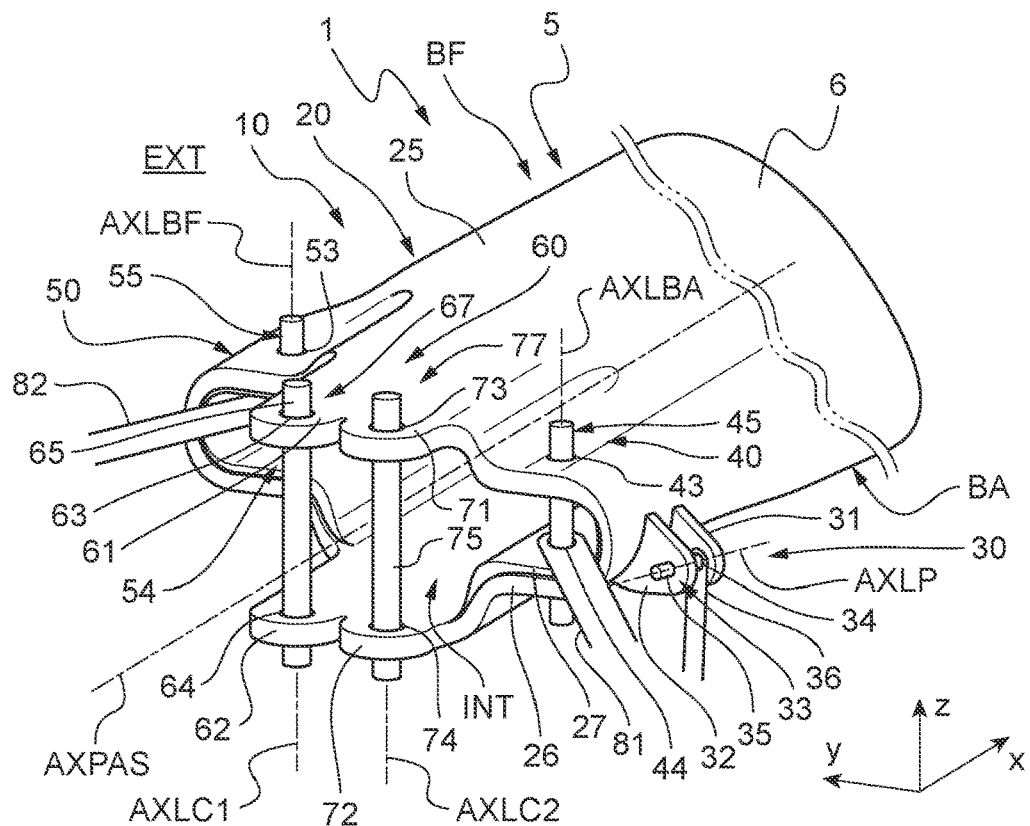
FIG. 1 is a perspective view of a blade according to the disclosure.
Figure 2:
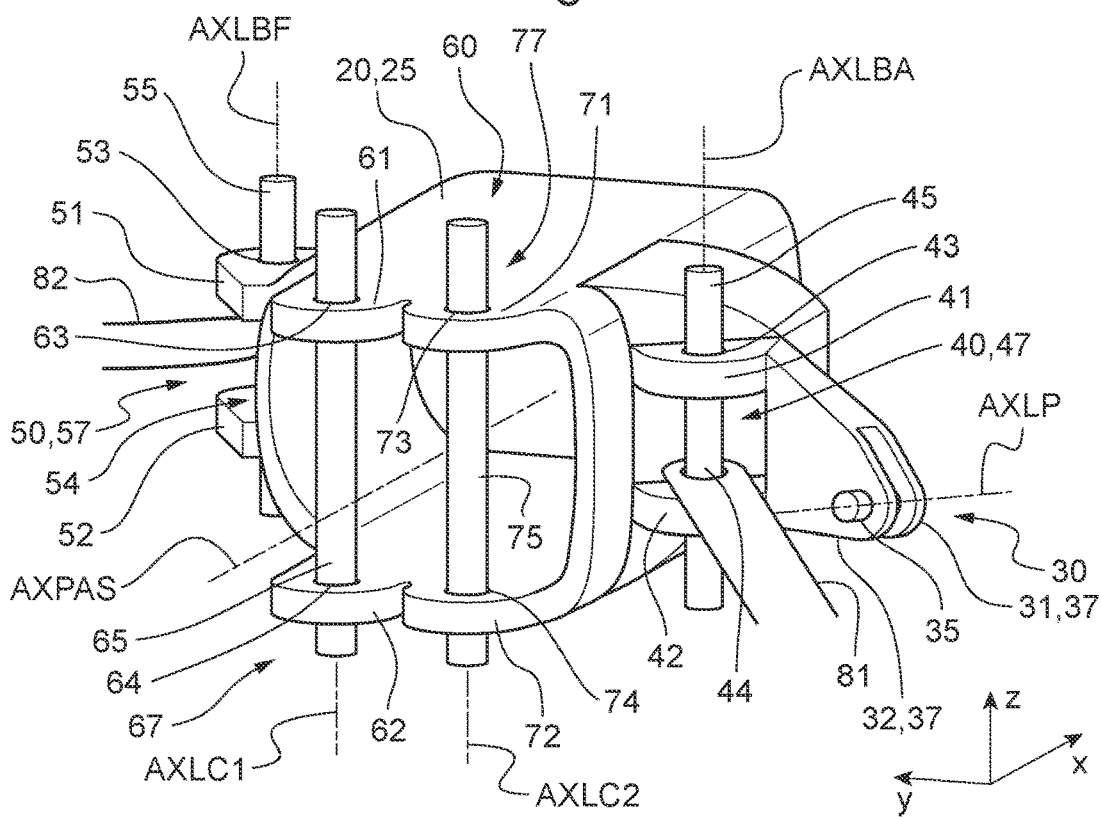
FIG. 2 is a perspective view of a blade according to the disclosure.

FIGS. 1 and 2 show examples of blades 1 according to the disclosure.

Irrespective of the embodiment and in reference to FIG. 1, this blade 1 comprises, longitudinally, i.e., spanwise, a blade root 10 that is extended by an aerodynamic intermediate part 5. The intermediate part 5 extends up to a free end 6.

The blade root 10 comprises a one-piece attachment body 20, i.e., an attachment body made in a single piece, made from composite materials.

The attachment body 20 is hollow, which tends to optimize its mass.

The attachment body 20 comprises, in particular, a casing 25 that defines an empty internal space INT. This casing 25 surrounds the internal space, possibly radially in relation to the pitch axis AXPAS of the blade. This casing 25 therefore totally surrounds a section of the pitch axis AXPAS of the blade 1. In other words, the pitch axis AXPAS passes through the internal space INT.

The casing 25 made from composite materials may comprise a stack of several composite plies of different orientations. Plies of the attachment body 20 may extend into the intermediate part 5.

According to another aspect, the attachment body 20 incorporates various attachments 30, 40, 50, 60. The term "incorporates" means that the attachments are integral parts of the attachment body 20, not attachments removably fastened to the attachment body 20 by screwing or other means.

Therefore, the attachment body 20 incorporates a pitch attachment 30 to be connected to a pitch lever 36 capable of setting the blade in rotation about a pitch axis AXPAS. The pitch lever 36 is shown schematically so as not to clutter FIG. 1. This pitch attachment 30 may be traversed along a pitch connection axis AXLP by a pitch link rod 35 connected to a pitch lever 36 and, for example, to a hinge of the pitch lever 36. For example, such a pitch link rod 35 comprises a screw, or indeed a nut, a pin or the like. According to one example, the pitch lever 36 comprises a pitch ball joint, the pitch link rod 35 passing through a first part of the pitch attachment 30, the pitch ball joint and a second part of the pitch attachment 30.

The pitch attachment 30 may possibly be positioned on the leading edge BA side of the blade 1.

According to one possibility, the pitch attachment 30 may comprise a pitch clevis 37. This pitch clevis 37 may be a female clevis comprising two parallel pitch wings 31, 32 that are inseparable from the casing 25. A pitch lever 36 may extend between the two pitch wings 31, 32 to be hinged by the pitch link rod 35 to the blade 1. To this end, the two pitch wings 31, 32 respectively comprise two pitch holes 33, 34 aligned along the pitch connection axis AXLP and configured to be traversed by the pitch link rod 35.

Moreover, the pitch clevis 37 protrudes from the casing 25 into an area EXT outside the blade 1.

In addition, the attachment body 20 incorporates a connection attachment 60 to be connected to a rotor head and, for example, to a stratified spherical stop 95 fastened to the rotor head. This connection attachment 60 may be traversed by at least two connecting rods 65, 75 connected to a first reinforcement 96 of a stratified spherical stop 95 along a connection axis AXLC1, AXLC2. For example, each connecting rod 65, 75 comprises a screw, or indeed a nut, a pin or the like. According to one example, each connecting rod 65, 75 passes through a first part of the connection attachment 60, the first reinforcement 96 then a second part of the connection attachment 60.

The connection attachment 60 may comprise one connection set 67, 77 for each respective connecting rod to be connected to the rotor head.

Irrespective of the number of sets, each set 67, 77 comprises two connection holes 63-64, 73-74. The two connection holes 63-64, 73-74 of a given connection set 67, 77 are provided in the casing 25, for example to either side of the internal space INT or being offset outside the internal space parallel to the pitch axis, as shown. Each connection hole 63-64, 73-74 passes all the way through part of the casing 25. The two connection holes 63-64, 73-74 of a given connection set 67, 77 are aligned along a connection axis AXLC1, AXLC2 configured for a connecting rod 65, 75 to pass therethrough.

For example, the casing 25 comprises a first upper surface 61 provided with a first upper connection hole 63 and a first lower surface 62 provided with a first lower connection hole 64 situated in line with the first upper connection hole 63 along a first connection axis AXLC1. Furthermore, the casing 25 comprises a second upper surface 71 provided with a second upper connection hole 73 and a second lower surface 72 provided with a second lower connection hole 74 situated in line with the second upper connection hole 73 along a second connection axis AXLC2. A first connecting rod 65 can thus pass through the first upper connection hole 63, a reinforcement of a stratified spherical stop 95, then the first lower connection hole 64. Furthermore, a second connecting rod 75 can thus pass through the second upper connection hole 73, the abovementioned reinforcement of the stratified spherical stop 95, then the second lower connection hole 74.

Moreover, the attachment body 20 incorporates a leading edge attachment 40 to be connected to a first drag damper 81. The first drag damper 81 is shown schematically so as not to clutter FIG. 1. The leading edge attachment 40 is positioned on the leading edge BA side of the blade 1.

This leading edge attachment 40 may be traversed along a leading edge axis AXLBA by a leading edge link rod 45 connected to a first drag damper 81 and, for example, to a hinge of the first drag damper 81. For example, such a leading edge link rod 45 comprises a screw or indeed a nut, a pin or the like. According to one example, the hinge comprises a leading edge ball joint, the leading edge link rod 45 passing through a first part of the leading edge attachment 40, the leading edge ball joint and a second part of the leading edge attachment 40.

Finally, the attachment body 20 incorporates a trailing edge attachment 50 to be connected to a second drag damper 82. The second drag damper 82 is shown schematically so as not to clutter FIG. 1. This trailing edge attachment 50 may be traversed along a trailing edge axis AXLBF by a trailing edge link rod 55 connected to the second drag damper 82 and, for example, to a hinge of the second drag damper 82. For example, such a trailing edge link rod 55 comprises a screw or indeed a nut, a pin or the like. According to one example, the hinge comprises a trailing edge ball joint, the trailing edge link rod 55 passing through a first part of the trailing edge attachment 50, the trailing edge ball joint and a second part of the trailing edge attachment 50.

The pitch attachment 30 may possibly be closer to the leading edge attachment 40 than to the trailing edge attachment 50.

Moreover, the trailing edge axis AXLBF, the leading edge axis AXLBA and the connection axes AXLC1, AXLC2 may be parallel. The pitch connection axis AXLP may then lie in a plane perpendicular to these trailing edge AXLBF, leading edge AXLBA and connection AXLC1, AXLC2 axes.

According to another feature unrelated to the above, the casing 25 is made from composite materials. The casing 25 may comprise a layer 26 made from composite materials, and this layer 26 may surround the internal space INT. Furthermore, this layer 26 may extend the intermediate part 5, for example having plies in common with the intermediate part 5.

The casing 25 may further comprise at least one laminate reinforcement 27 secured to the layer 26, for example at least at the trailing edge attachment 50 and/or at the leading edge attachment 40.

In this context, FIG. 1 shows a first embodiment of the leading edge 40 and trailing edge 50 attachments.

According to this first embodiment, the leading edge attachment 40 comprises two leading edge holes 43, 44 provided in the casing 25 to either side of the internal space INT according to a leading edge axis AXLBA. Each leading edge hole 43, 44 passes all the way through a part of the casing 25. The leading edge link rod 45 may thus pass successively, along the leading edge axis AXLBA, through a leading edge hole 43, a first drag damper 81 present in the internal space INT, then the other leading edge hole 44.

Similarly, the trailing edge attachment 50 comprises two trailing edge holes 53, 54 provided in the casing 25 to either side of the internal space INT according to a trailing edge axis AXLBF. Each trailing edge hole 53, 54 passes all the way through a part of the casing 25. The trailing edge link rod 55 may thus pass successively, along the trailing edge axis AXLBF, through a trailing edge hole 53, a second drag damper 82 present in the internal space INT, then the other trailing edge hole 54.

FIG. 2 shows a second embodiment of the leading edge 40 and trailing edge 50 attachments.

The leading edge attachment 40 comprises a leading edge clevis 47. This leading edge clevis 47 may be a female clevis comprising two parallel leading edge wings 41, 42 that are inseparable from the casing 25. A first drag damper 81 may extend between the two leading edge wings 41, 42 to be hinged by a leading edge link rod 45 to the blade 1. To this end, the two leading edge wings 41, 42 respectively comprise two leading edge holes 43, 44 that are aligned along a leading edge axis AXLBA and configured to be traversed by the leading edge link rod 45.

Moreover, the leading edge clevis 47 protrudes from the casing 25 into the area EXT outside the blade 1.

Each pitch wing 31, 32 is possibly connected to the two leading edge wings 41, 42.

Similarly, the trailing edge attachment 50 comprises a trailing edge clevis 57. This trailing edge clevis 57 may be a female clevis comprising two parallel trailing edge wings 51, 52 that are inseparable from the casing 25. A second drag damper 82 may extend between the two trailing edge wings 51, 52 to be hinged by a trailing edge link rod 55 to the blade 1. To this end, the two trailing edge wings 51, 52 respectively comprise two trailing edge holes 53, 54 that are aligned along a trailing edge axis AXLBF and configured to be traversed by the trailing edge link rod 55.

Moreover, the trailing edge clevis 57 protrudes from the casing 25 into the area EXT outside the blade 1.

FIGS. 1 and 2 show two embodiments. However, other embodiments can be obtained by combining the examples of FIGS. 1 and 2. Therefore, one of the leading edge 40 and trailing edge 50 attachments of FIG. 1 could be replaced by the corresponding attachment of FIG. 2.

Figure 3:
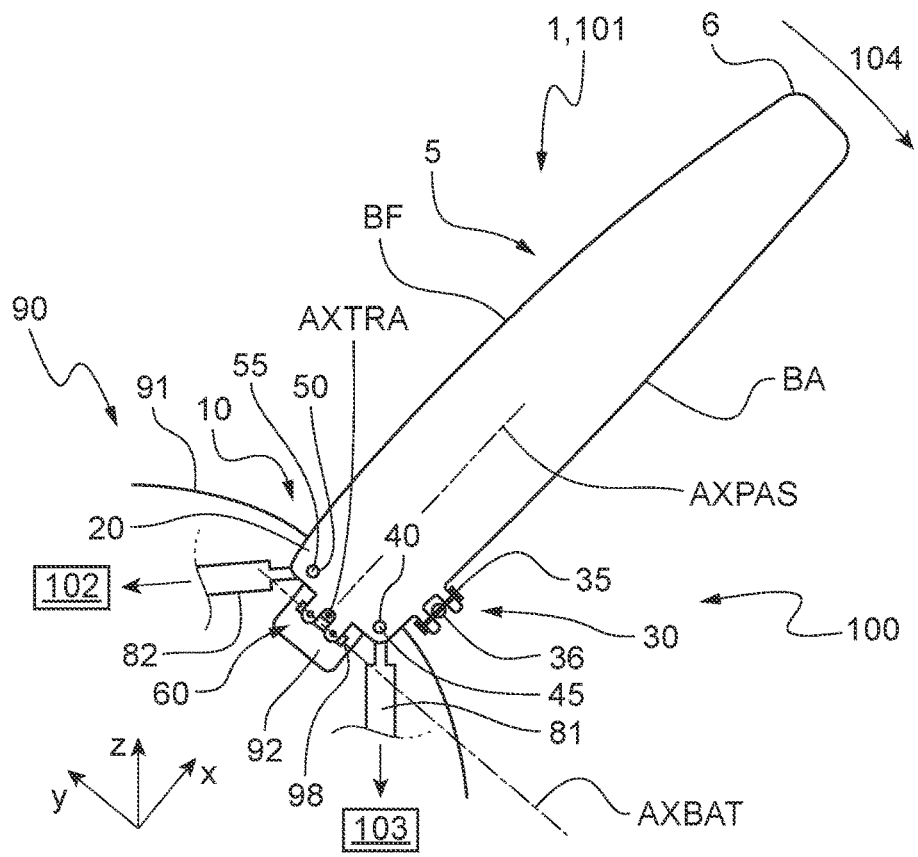
FIG. 3 is a partial view of a rotor having a blade according to the disclosure.

FIG. 3 shows a rotor 90 provided with a blade 1 as previously described. This rotor 90 may optionally be arranged on an aircraft 100. The blade that is shown is of the type shown in FIG. 1, but could be the type shown in FIG. 2 or an alternative type.

The rotor 90 is provided with a rotor head 91 carrying at least one blade 1. Reference 1 is used to refer to any blade according to the disclosure, references 101, 102 and 103 being used to denote particular blades.

The rotor 90 may comprise one stratified spherical stop 95 for each blade 1, each blade 1 then being hinged to the rotor head 91 by a corresponding stratified spherical stop 95. Such a blade 1 may then have freedom of movement in rotation, in relation to the rotor head 91, about a pitch axis AXPAS, a flapping axis AXBAT and a drag axis AXTRA that all coincide.

Figure 4:
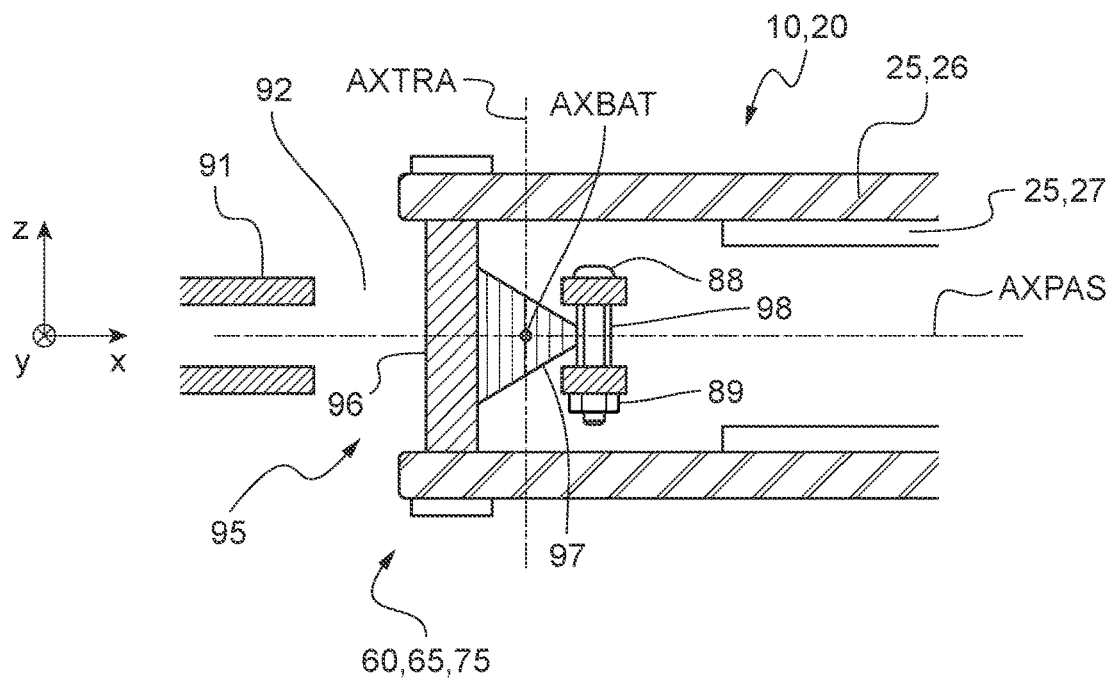
FIG. 4 is a local cross-sectional view of a rotor having a blade according to the disclosure.

In reference to FIG. 4, the rotor head 91 may comprise one cavity 92 for each blade 1 accommodating a stratified spherical stop 95. This stratified spherical stop 95 may comprise a stratified central part 97 inserted between a first reinforcement 96 and a second reinforcement 98. The second reinforcement 98 may be secured to the rotor head 91 by conventional means 88,89. In addition, the first reinforcement 96 is secured to the root 10 of the blade 1 via the connecting rods 65, 75.

In reference to FIG. 3, a pitch link rod 35 passes through the pitch attachment 30 of the blade 1 and a pitch hinge of a pitch rod 36.

Moreover, a leading edge link rod 45 passes through the leading edge attachment 40 and a leading edge hinge of a first drag damper 81. Similarly, a trailing edge link rod 55 passes through the trailing edge attachment 50 and a trailing edge hinge of a second drag damper 82.

The rotor 90 may possibly comprise at least three blades 101, 102, 103. In this case, the second drag damper 82 of a particular blade 101 may be hinged to the leading edge attachment 40 of the following blade 102 in the direction of rotation 104 of the rotor 90. Moreover, the first drag damper 81 of the particular blade 101 may be hinged to the trailing edge attachment 50 of the preceding blade 103 in the direction of rotation 104.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A blade comprising a blade root extended by an aerodynamic intermediate part that extends up to a free end,
wherein the blade root comprises a one-piece attachment body made from composite materials, the attachment body being hollow and having a casing that defines an empty internal space, the attachment body incorporating a pitch attachment configured to be traversed by a pitch link rod connected to a pitch lever, the attachment body incorporating a leading edge attachment configured to be traversed by a leading edge link rod connected to a first drag damper, the attachment body incorporating a trailing edge attachment configured to be traversed by a trailing edge link rod configured to be connected to a second drag damper, the attachment body incorporating a connection attachment configured to be traversed by at least two connecting rods connected to a first reinforcement of a stratified spherical stop; and
wherein the leading edge attachment comprises two leading edge holes provided in the casing to either side of the internal space according to a leading edge axis, the two leading edge holes being configured to be traversed by the leading edge link rod along the leading edge axis.

2. The blade according to claim 1,
wherein the pitch attachment is closer to the leading edge attachment than to the trailing edge attachment.

3. The blade according to claim 1,
wherein the pitch attachment comprises a pitch clevis provided with two parallel pitch wings that are inseparable from the casing, the two pitch wings respectively comprising two pitch holes aligned along a pitch connection axis and configured to be traversed by the pitch link rod along the pitch connection axis, the pitch clevis protruding from the casing into an area outside the blade.

4. The blade according to claim 1,
wherein the leading edge attachment comprises a leading edge clevis provided with two parallel leading edge wings that are inseparable from the casing, the two leading edge wings respectively comprising two leading edge holes that are aligned along a leading edge axis and configured to be traversed by the leading edge link rod along the leading edge axis, the leading edge clevis protruding from the casing into an area outside the blade.

5. The blade according to claim 3,
wherein the leading edge attachment comprises a leading edge clevis provided with two parallel leading edge wings that are inseparable from the casing, the two leading edge wings respectively comprising two leading edge holes that are aligned along a leading edge axis and configured to be traversed by the leading edge link rod along the leading edge axis, the leading edge clevis protruding from the casing into an area outside the blade, and wherein each pitch wing is connected to the two leading edge wings.

6. The blade according to claim 1,
wherein the trailing edge attachment comprises a trailing edge clevis provided with two parallel trailing edge wings that are inseparable from the casing, the two trailing edge wings respectively comprising two trailing edge holes that are aligned along a trailing edge axis and configured to be traversed by the trailing edge link rod along the trailing edge axis, the trailing edge clevis protruding from the casing into an area outside the blade.

7. The blade according to claim 1,
wherein the trailing edge attachment comprises two trailing edge holes provided in the casing to either side of the internal space according to a trailing edge axis, the two trailing edge holes being configured to be traversed by the trailing edge link rod along the trailing edge axis.

8. The blade according to claim 3,
wherein the leading edge attachment comprises a leading edge clevis provided with two parallel leading edge wings that are inseparable from the casing, the two leading edge wings respectively comprising two leading edge holes that are aligned along a leading edge axis and configured to be traversed by the leading edge link rod along the leading edge axis, the leading edge clevis protruding from the casing into an area outside the blade, and wherein the trailing edge attachment comprises a trailing edge provided with two parallel trailing edge wings that are inseparable from the casing, the two trailing edge wings respectively comprising two trailing edge holes that are aligned along a trailing edge axis and configured to be traversed by the trailing edge link rod along the trailing edge axis, the trailing edge clevis protruding from the casing into an area outside the blade.

9. The blade according to claim 3,
wherein the trailing edge attachment comprises two trailing edge holes provided in the casing to either side of the internal space according to a trailing edge axis, the two trailing edge holes being configured to be traversed by the trailing edge link rod along the trailing edge axis.

10. The blade according to claim 1,
wherein the connection attachment comprises, for each connecting rod, a set of two connection holes provided in the casing along a connection axis configured to coincide with the connecting rods.

11. The blade according to claim 1,
wherein the casing comprises a layer made from composite materials surrounding the internal space and extending the intermediate part, the casing comprising a laminate reinforcement at least at the trailing edge attachment and the leading edge attachment.

12. A rotor provided with a rotor head, the rotor comprising at least one stratified spherical stop, the stratified spherical stop comprising a stratified central part inserted between a first reinforcement and a second reinforcement, the second reinforcement being fastened to the rotor head,
wherein the rotor comprises at least one blade according to claim 1, the rotor comprising the at least two connecting rods passing through the connection attachment and the second reinforcement, the rotor comprising a pitch link rod passing through the pitch attachment and a pitch hinge of a pitch rod, the rotor comprising a leading edge link rod passing through the leading edge attachment and a leading edge hinge of a first drag damper, the rotor comprising a trailing edge link rod passing through the trailing edge attachment and a trailing edge hinge of a second drag damper.

13. The rotor according to claim 12,
wherein, the rotor comprises at least three blades, the trailing edge attachment of a particular blade is connected by a drag damper to the leading edge attachment of the following blade in a direction of rotation of the rotor and the leading edge attachment of the particular blade is connected by another drag damper to the trailing edge attachment of the preceding blade in the direction of rotation.

14. An aircraft,
wherein the aircraft comprises the rotor according to claim 12.

15. A blade comprising a blade root extended by an aerodynamic intermediate part that extends up to a free end,
wherein the blade root comprises a one-piece attachment body made from composite materials, the attachment body being hollow and having a casing that defines an empty internal space, the attachment body incorporating a pitch attachment configured to be traversed by a pitch link rod connected to a pitch lever, the attachment body incorporating a leading edge attachment configured to be traversed by a leading edge link rod connected to a first drag damper, the attachment body incorporating a trailing edge attachment configured to be traversed by a trailing edge link rod configured to be connected to a second drag damper, the attachment body incorporating a connection attachment configured to be traversed by at least two connecting rods connected to a first reinforcement of a stratified spherical stop; and
wherein the trailing edge attachment comprises two trailing edge holes provided in the casing to either side of the internal space according to a trailing edge axis, the two trailing edge holes being configured to be traversed by the trailing edge link rod along the trailing edge axis.

16. The blade according to claim 15,
wherein the pitch attachment is closer to the leading edge attachment than to the trailing edge attachment.

17. The blade according to claim 15,
wherein the pitch attachment comprises a pitch clevis provided with two parallel pitch wings that are inseparable from the casing, the two pitch wings respectively comprising two pitch holes aligned along a pitch connection axis and configured to be traversed by the pitch link rod along the pitch connection axis, the pitch clevis protruding from the casing into an area outside the blade.

18. A blade comprising a blade root extended by an aerodynamic intermediate part that extends up to a free end,
wherein the blade root comprises a one-piece attachment body made from composite materials, the attachment body being hollow and having a casing that defines an empty internal space, the attachment body incorporating a pitch attachment configured to be traversed by a pitch link rod connected to a pitch lever, the attachment body incorporating a leading edge attachment configured to be traversed by a leading edge link rod connected to a first drag damper, the attachment body incorporating a trailing edge attachment configured to be traversed by a trailing edge link rod configured to be connected to a second drag damper, the attachment body incorporating a connection attachment configured to be traversed by at least two connecting rods connected to a first reinforcement of a stratified spherical stop; and
wherein the casing comprises a layer made from composite materials surrounding the internal space and extending the intermediate part, the casing comprising a laminate reinforcement at least at the trailing edge attachment and the leading edge attachment.

19. The blade according to claim 18,
wherein the leading edge attachment comprises two leading edge holes provided in the casing to either side of the internal space according to a leading edge axis, the two leading edge holes being configured to be traversed by the leading edge link rod along the leading edge axis, and wherein the trailing edge attachment comprises two trailing edge holes provided in the casing to either side of the internal space according to a trailing edge axis, the two trailing edge holes being configured to be traversed by the trailing edge link rod along the trailing edge axis.

20. The blade according to claim 18,
wherein the pitch attachment is closer to the leading edge attachment than to the trailing edge attachment.

* * * * *